US009075667B2

(12) United States Patent
Torgersen et al.

(10) Patent No.: US 9,075,667 B2
(45) Date of Patent: Jul. 7, 2015

(54) DYNAMIC BINDING DIRECTED BY STATIC TYPES

(75) Inventors: Mads Torgersen, Issaquah, WA (US);
Anders Hejlsberg, Seattle, WA (US);
James J. Hugunin, Mercer Island, WA (US); Matthew J. Warren, Redmond, WA (US); Neal Gafter, San Jose, CA (US); Lucian Jules Wischik, Seattle, WA (US); Robert Eric Lippert, Seattle, WA (US); Samuel Y. Ng, Bellevue, WA (US); Christopher Joseph Burrows, Seattle, WA (US); Alex C. Turner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1094 days.

(21) Appl. No.: 12/469,696

(22) Filed: May 21, 2009

(65) Prior Publication Data

US 2010/0299660 A1 Nov. 25, 2010

(51) Int. Cl.
G06F 9/44 (2006.01)
G06F 9/45 (2006.01)
G06F 9/445 (2006.01)

(52) U.S. Cl.
CPC .............. *G06F 8/54* (2013.01); *G06F 9/44521* (2013.01)

(58) Field of Classification Search
CPC ................ G06F 8/41; G06F 8/45; G06F 8/48
USPC ........................ 717/148, 131, 132, 140, 150
See application file for complete search history.

(56) References Cited

U.S. PATENT DOCUMENTS

| 5,983,021 | A | * | 11/1999 | Mitrovic ........................ 717/158 |
|---|---|---|---|---|
| 6,427,234 | B1 | | 7/2002 | Chambers et al. |
| 6,684,395 | B2 | * | 1/2004 | Johnson et al. ................ 717/162 |
| 6,973,646 | B1 | | 12/2005 | Bordawekar et al. |
| 7,565,648 | B2 | * | 7/2009 | Kline et al. .................... 717/143 |
| 7,761,858 | B2 | * | 7/2010 | Chang et al. ................... 717/140 |
| 7,784,041 | B2 | * | 8/2010 | Lam et al. ...................... 717/151 |

(Continued)

OTHER PUBLICATIONS

Abadi, et al., "Dynamic Typing in a Statically Typed Language", ACM Transactions on Programming Languages and Systems, Retrieved at <<http://homepages.inf.ed.ac.uk/gdp/publications/Dynamic_Typing_in_a_Statically_Typed_Language.ps>>, vol. 13, No. 2, Apr. 1991, pp. 1-35.

(Continued)

*Primary Examiner* — Ernest Unelus
*Assistant Examiner* — Getente A Yimer
(74) *Attorney, Agent, or Firm* — Kevin Sullivan; Kate Drakos; Micky Minhas

(57) ABSTRACT

A static type, called "dynamic", is introduced into a statically bound programming language. An expression or subexpression that is defined as a static type called "dynamic" in the source code of a program written in the statically bound programming language, is bound based on its runtime type instead of on its compile time type. Binding can be performed based on a mixture of compile time and runtime types that are based on the specification of types of expressions in source code. This type of binding is called hybrid binding. Operations are bound using the runtime type of constituent expressions (i.e., the runtime type of a receiver, an argument, or an operand) typed as dynamic and the compile time type of static constituents. If any constituent expression of an operation is dynamic, binding occurs at runtime instead of at compile time.

20 Claims, 4 Drawing Sheets

(56) References Cited

U.S. PATENT DOCUMENTS

| | | | |
|---|---|---|---|
| 8,037,460 B2* | 10/2011 | Lee et al. | 717/136 |
| 8,245,210 B2* | 8/2012 | Ng et al. | 717/153 |
| 2003/0046358 A1* | 3/2003 | Johnson et al. | 709/216 |
| 2003/0170814 A1* | 9/2003 | Yucel et al. | 435/69.1 |
| 2007/0055978 A1* | 3/2007 | Meijer et al. | 719/331 |
| 2008/0282238 A1* | 11/2008 | Meijer et al. | 717/162 |
| 2008/0295083 A1* | 11/2008 | Meijer et al. | 717/143 |
| 2008/0320444 A1 | 12/2008 | Meijer et al. | |
| 2009/0328013 A1* | 12/2009 | Aharoni et al. | 717/140 |
| 2011/0047530 A1* | 2/2011 | Iyer | 717/125 |

OTHER PUBLICATIONS

Furr, et al., "Static Type Inference for Ruby", Proceedings of the 2009 ACM symposium on Applied Computing, Retrieved at <<http://www.cs.umd.edu/~jfoster/papers/oops09.pdf>>, 2009, pp. 8.

Ducournau, Roland, "Implementing Statically Typed Object-Oriented Programming Languages", ACM Journal Name, Retrieved at <<http://www.lirmm.fr/~ducour/Publis/RD-CSUR-02-05.pdf>>, vol. V, No. N, Aug. 2008, p. 104.

Demangeon, et al., "Static and Dynamic Typing for the Termination of Mobile Processes", Fifth IFIP International Conference on Theoretical Computer Science—TCS 2008, Retrieved at <<http://perso.ens-lyon.fr/romain.demangeon/Recherche/DemangeonStatic.pdf>>, Sep. 7-10, 2008, pp. 1-14.

Draheim, et al., "Dynamic Type Range Analysis", Retrieved at <<http://www.inf.fu-berlin.de/deprecated/pj/factory/references/dtr/dtr.pdf>>, Aug. 6, 2003, pp. 6.

* cited by examiner

DYNAMIC BINDING DIRECTED BY STATIC TYPES

BACKGROUND

A data type in programming languages is an attribute of data which imparts information about what kind of data it is. Constraints, such as what types of values the piece of data can take and what operations can be performed upon it, can also be established by assigning a data type to the data. A type system associates one or more data types with each program value in a program. By examining what the instructions in the program do to the value of the data, a type system attempts to prevent "type errors". For example, a particular programming language may consider assigning a string value to a variable of integer type to be a type error and will give an error message to the user who tries to do so. A type system also attempts to prevent illegal operations on data. For example, some programming languages consider adding a string and an integer together to be an illegal operation and will give an error message to the user who tries to do so. Type checking can occur either at compile time (a static check or static type checking) or at runtime (a dynamic check or dynamic type checking). If a language applies its typing rules vigorously, (for example, only allowing automatic type conversions which do not lose information), it is called a strongly-typed language. If a language is relatively less restrictive, it is called weakly typed.

A programming language is said to use static typing when type checking is performed during compile time. In static typing, types are associated with variables. Statically typed languages include Ada, C, C++, C#, Java, Fortran, Haskell, ML, Pascal and Scala. Static typing allows many errors to be caught early in the development cycle. Because static type checkers evaluate type information during compilation, and lack type information that is only available at runtime, static type checkers are conservative. That is, even if a particular execution of a program would run correctly, the program will be rejected by a static type checker if the conditions evaluated do not hold for all possible executions of the program. Because static type checkers evaluate the type information that can be determined at compile time and verify that the checked conditions hold for all possible executions of the program, there is no need to repeat static type checks every time the program is executed.

A programming language is said to be dynamically typed when most of the type checking is performed at runtime. In dynamic typing types are associated with values resulting from execution of the program. Dynamically typed languages include Clojure, Groovy, JavaScript, Lisp, Objective-C, PHP, Prolog, Python, Ruby, and Smalltalk. Dynamic typing is less rigid than static typing but can result in a greater potential for execution errors (e.g., an error results because a value for a variable has an unallowed type). Dynamically typed language systems typically make fewer compile time checks on the source code. Runtime checks potentially can be more sophisticated because they can use dynamic (runtime) information in addition to information that was present during compilation and is still available at runtime. Runtime checks assert that conditions hold in a particular execution of the program and are repeated for each execution of the program.

Binding also selects which actual operation to use when a syntactic operation is applied in source code. Binding can occur either at compile time, in which case it is called "static binding", or can occur dynamically at runtime, which is called "dynamic binding". Dynamic binding allows the postponement of the resolving of undefined variables until a program is run. Dynamic binding is fundamentally different from static binding because its result—the meaning assigned to an operation, for example—depends on the runtime types of the actual values it operates on instead of on the compile time types of the variables in the source code. Typically, statically typed programming languages perform static binding and dynamically typed programming languages perform dynamic binding. Moreover, typically, binding of a particular operation is either fully static (binding occurs at compile time based on the compile time types of the variables in the source code) or is fully dynamic (binding occurs at runtime based on the runtime types of the runtime values resulting from computations).

SUMMARY

A static type, called "dynamic" herein, is introduced into a primarily statically bound programming language. A constituent of an operation (e.g., an expression) where the constituent is defined as dynamic, is bound based on its runtime type instead of on its compile time type. Binding of an operation in the primarily statically bound programming language can occur at compile time based on the compile time types of expressions and subexpressions associated with the operation, at runtime based on the runtime types of the values of expressions and subexpressions associated with the operation or at runtime based on both the compile time types of some expressions and subexpressions and the runtime types of some values of expressions and subexpressions associated with the operation. The latter type of binding is called hybrid binding herein. Operations can be bound using the runtime type of constituent expressions (such as the runtime type of a receiver, an argument, or an operand, etc.) statically typed as dynamic and the compile time type (which may be less specific) of other non-dynamic static constituents. If a constituent expression of an operation is dynamic, binding occurs at runtime instead of at compile time. Hybrid binding can also refer to cases in which a candidate set of meanings for an operation (e.g., a method is called on a class) is known at compile time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
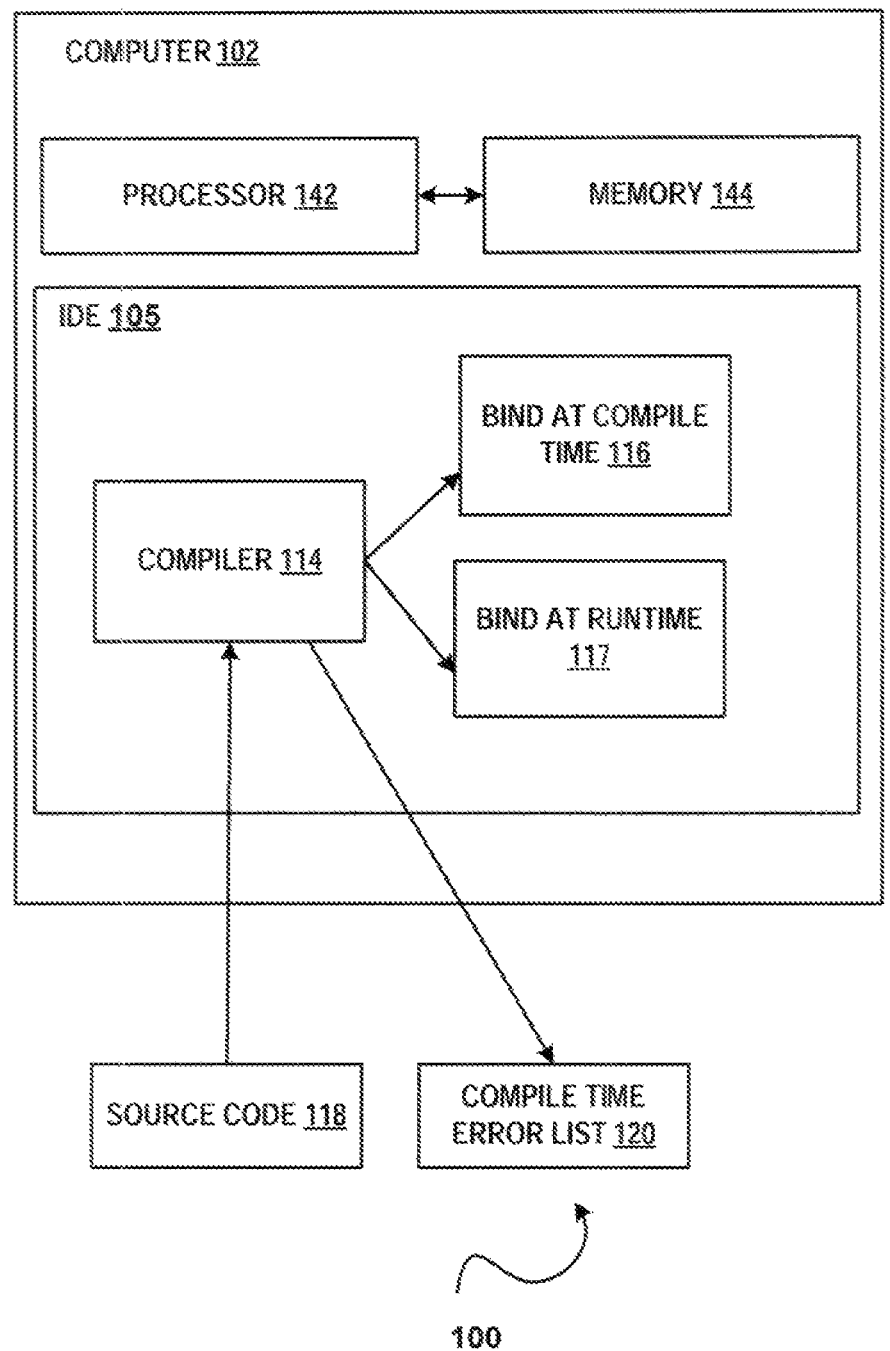
FIG. 1 is a block diagram of an example of a system for dynamic binding directed by static types in accordance with aspects of the subject matter disclosed herein.

Statically and dynamically typed languages generally have very different flavors and fundamentally diverging semantics. Static languages (such as C#, Java, etc.) perform static binding, where the meaning of an operation is determined during a separate compilation phase. Dynamic languages (e.g., Python, Smalltalk, Ruby) bind at runtime, though some of them may perform some amount of type checking at compile time (e.g., Objective-C, Strongtalk). Even when type checking is performed at compile time, dynamic binding is fundamentally different from static binding because its result—the meaning assigned to operations—depends on the runtime types of values involved for this particular execution of the program, instead of on the compile time types of the expressions in the source code. Therefore, runtime semantics are typically drastically different from compile time semantics.

In known programming languages binding of a given operation is either fully static or fully dynamic, that is, binding is either based fully on compile time types or fully on runtime types. A particular language may, however, embrace both static binding and dynamic binding. For example, in Visual Basic, under certain compiler settings, using the type "object" for the receiver of a member access causes dynamic ("late") binding for the member access operation. In known languages, however, even in those that embrace both static and dynamic binding, when an operation is statically bound, binding is performed based only on compile time types and when an operation is dynamically bound binding is based only on runtime types.

The subject matter described herein allows binding to fall anywhere on the scale from fully static to fully dynamic, and allows the user to exercise control over how static or how dynamic a particular binding will be by controlling the types of constituent expressions in source code. Hence within a semantically statically inclined programming language, all forms of binding: fully static, fully dynamic or binding based on both the compile time type of some expressions and the runtime type of some values (hybrid binding) can be available. The form of binding referred to herein as hybrid binding can also be thought of as dynamic binding that is directed by static types because if any expression associated with an operation has a static type of "dynamic", binding is deferred to runtime. Because static and dynamic languages are so different in feel, introducing dynamic constructs into a statically typed language is likely to cause impedance mismatches. This can be addressed by carefully selecting the way in which the dynamic features described herein are implemented.

When designing a dynamic feature for a static language, the compiler and the binder (linker) have to be signaled that a particular binding is to occur at runtime. Options to perform this type of signaling to the compiler and binder include having syntactically different dynamic versions of all operations, having syntactically designated dynamic "contexts" in which all operations are bound dynamically and having designated types for which operations on the designated types are bound dynamically.

All of these approaches can be used to implement partially dynamic binding in a static language but the third option has no syntactic overhead at the point of the operation. Because the syntax does not make it obvious, it may be harder for the user to know when dynamic binding will occur. Hence, it may be helpful to have clear and simple rules for when dynamic binding is invoked.

Dynamic Binding Directed By Static Types

FIG. 1 illustrates an example of a system 100 that performs dynamic binding directed by static types (hybrid binding) in accordance with aspects of the subject matter disclosed herein. It will be appreciated that system 100 may also perform fully static and/or fully dynamic binding in addition to hybrid binding. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 105) such as the ones described and illustrated below with respect to FIG. 4. Alternatively, system 100 or portions thereof may be provided as a stand-alone system or as a plug-in.

System 100 may include one or more of: a processor (such as processor 142), a memory 144, and a compiler 114. Other components well known in the arts may also be included but are not here shown. It will be appreciated that compiler 114 can be loaded into memory 144 to cause the processor to perform the actions attributed to the compiler. Compiler 114, in accordance with aspects of the subject matter disclosed herein, may receive source code 118, and determine that binding occurs at runtime 117 or that binding occurs at compile time 116. A compile time error list 120 for dynamic binding errors can be produced by compiler 114.

Figure 2:
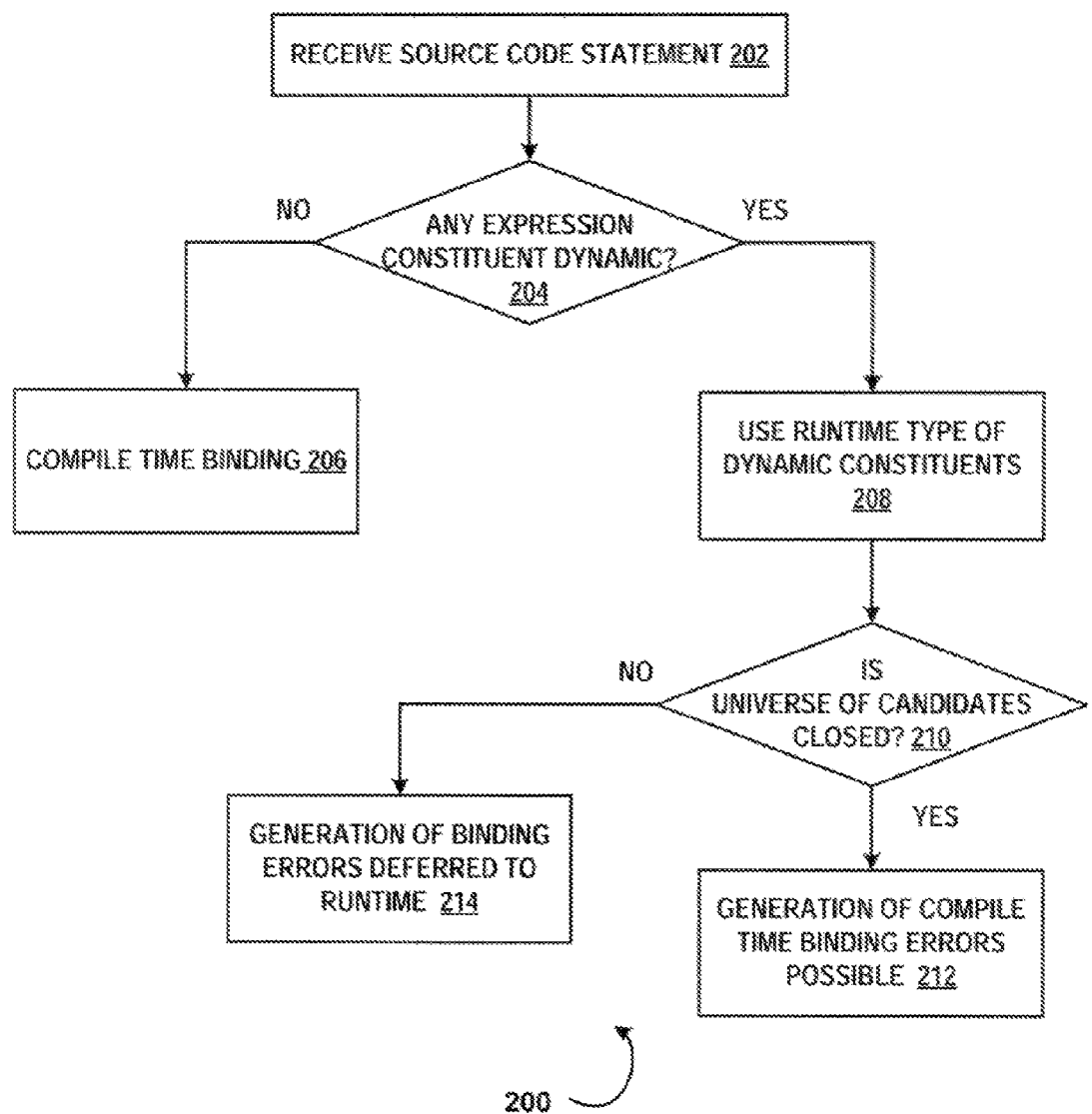
FIG. 2 is a flow diagram of an example of a method for dynamic binding directed by static types in accordance with aspects of the subject matter disclosed herein.

FIG. 2 illustrates an example of a method 200 for dynamic binding directed by static types (hybrid binding) in accordance with aspects of the subject matter disclosed herein. At 202 a compiler receives a source code statement or statements. At 204 the compiler examines the statement(s) to determine if any expressions or subexpressions associated with an operation have a static type "dynamic". If no expressions or subexpressions have a static type "dynamic" compile time binding is performed at 206. If at least one expression or subexpression has the static type dynamic, at 208 the runtime type of the dynamic expression or subexpression is used and binding is deferred to runtime. At 210, the universe of binding candidates is examined. If it is determined that the universe of binding candidates is closed, at 212 generation of dynamic binding errors at compile time is possible, and if possible, a compile time error list for dynamic binding errors is produced. The error list may be displayed to the user on a display device and/or can be printed. If it is determined that the universe of binding candidates is open, at 214 generation of binding errors at compile time is not possible, and producing an error list of binding errors is deferred to runtime. The following examples of source code and descriptions thereof will illuminate the foregoing.

C# is a static language, and traditionally has been fully statically typed and thus has binding semantics designed for a statically bound language. The subject matter disclosed herein, which introduces user-controlled hybrid binding, dynamic binding that is directed by assigning a static type to a constituent of an expression, is described within the specific setting of C#, but can be applied to any programming language including but not limited to Ada, C, C++, C#, Java, Fortran, Haskell, ML, Pascal and Scala, to integrate dynamic features without changing the flavor of the "host" language or adding syntactic bifurcation.

The following portion of a sample program illustrates having a designated type to signal when the runtime type of the value of the expression is used to determine what kind of binding is performed instead of using the compile time type of the expression in the source code to determine what kind of binding is performed. The static type that designates that binding will take place at runtime is called "dynamic" herein, however, it will be appreciated that the specific term used is arbitrary and any designation can be chosen to communicate this concept.

```
class C { public void M( ) { Console.WriteLine("C"); } }
class D : C { public new void M( ) { Console.WriteLine("D"); } }
C c = new D( );
c.M( );
dynamic d = c;
d.M( );
```

The variable c has the compile time type C and the runtime type D as will be described below. In this program, the line:
    class C {public void MO {Console.WriteLine("C");}}
defines class C. Class C declares method M. When the method M of class C is called, a "C" is printed on the console. Method M is a static method, meaning that the method M can be called on the class itself rather than on an instance of the class. A dynamic method is called on an instance of a class.

The line:
    class D:C {public new void M( ){Console.WriteLine ("D");}}
defines Class D. Class D derives from class C and any object of class D can offer or contain the method M of class C. Class D declares method M. Any object of class D can offer or contain the method M of class D but an object of class C that is not of class D cannot offer or contain the method M of class D. When the method M of class D is called, a "D" is printed on the console. The method M in class C and the method M in class D are unrelated. The method M in class D does not override the method M in class C but in certain circumstances it may hide or shadow it.

The line:
    C c=new D( );
creates a new object of type D. When the program executes, the new object is assigned to a variable c of type C, hence the runtime type of c is D. The line:
    c.M( );
calls the method M on the object assigned to variable c. In response to executing this line "C" is printed on the console. The reason that "C" is printed on the console instead of "D" is because the meaning of c.M is statically bound to the M in class C based on the compile time type of the variable c. Because this is a static invocation, and the method is bound at compile time, the compiler is unaware of the runtime type D of variable c. The next line:
    dynamic d=c;
assigns c to a variable d which has a static (compile time) type of "dynamic".

Because the compile time type of d is dynamic, the runtime type of d is used for binding. The runtime type of d is D because d was assigned the value of c and c was defined by the line "C c=new D( );" to assume the value of the new object of type D when the program executes. The line:
    d.M( );
calls the method M on the object assigned to variable d (which is the same object on which the method M in class C was called above). In response to executing this line, "D" is printed on the console. The meaning of d.M is dynamically bound to the M in class D based on the runtime type of the variable d. Because this is a dynamic invocation, and the method is bound at runtime, the compiler defers the job of binding to the runtime. When the program is run, the binder of the runtime determines which method to call. It evaluates the runtime type of the object, determines that it was created of type D and uses that type to bind the method M. Thus, the method M that is bound is the M that is defined in class D. In response to executing the method M of class D, "D" is printed on the console.

In accordance with aspects of the subject matter disclosed herein, wherever an expression of type dynamic is a constituent of an operation to be bound, the binding of that operation uses the runtime type of the dynamic expression. Operations for which expressions can be bound dynamically include but are not limited to: a method call, an operator application, a field access, a property access, a member access, an implicit or explicit conversion, a constructor call, an indexer access, an invocation and so on. Roles that an expression can assume in an operation that can cause dynamic binding include but are not limited to the following roles: receiver, argument, operand, index and so on. In accordance with aspects of the subject matter disclosed herein, wherever a non-dynamic expression is a constituent of an operation to be bound, the binding of that operation uses the static type of the non-dynamic expression. In this way, the degree to which binding is dynamic is user-controlled. The runtime type of an expression is used for binding only if the compile time type is dynamic.

The following sample program demonstrates this point.

```
class C {
    static void M(object o1, object o2) { Console.WriteLine("1"); }
    static void M(object o1, string s2) { Console.WriteLine("2"); }
    static void M(string s1, string s2) { Console.WriteLine("3"); }
}
object o = "object";
dynamic d = "dynamic";
C.M(o, o);
C.M(o, d);
C.M(d, d);
```

The lines:

```
class C {
    static void M(object o1, object o2) { Console.WriteLine("1"); }
    static void M(object o1, string s2) { Console.WriteLine("2"); }
    static void M(string s1, string s2) { Console.WriteLine("3"); }
}
``` declares a class C with three overloaded methods. The three overloaded methods have the same name ("M") but the methods have different parameter lists. The first M method expects two objects: o1 and o2; the second M method expects an object and a string: o1 and s2; and the third M method expects two strings: s1 and s2.

The line:
    object o="object";
declares a variable o of type object and assigns the string "object" to the variable o. That is, at runtime, an instance of an object o will have the value "object". Hence, object o has a compile time type of object and a runtime type of string with the value "object". Object is the most general type in C#'s type system, so assigning a string to variable o will not cause a compile time error.

The line:
    dynamic d="dynamic";
creates a variable d that has a compile time type of dynamic and is assigned the string value "dynamic" at runtime, hence its runtime type is string. The next three lines examine what happens when the static methods referenced in the lines are called on class C with different combinations of the variables previously declared.

The line:

C.M(o, o);

calls the static method M of class C with both arguments being the variable o of compile time type object. This type of call exists currently in C# and uses static binding for both arguments. There are no constituents that have a static type of "dynamic" in the list of arguments so this method call is resolved completely at compile time. The overloaded method M that is selected is the only declared method that applies statically. Because type string is more specific than type object, the only method that can accept the two arguments o and o (two variables of type object) is the method declared in the line:

static void M(object o1, object o2) {Console.WriteLine ("1");}

The compiler completely determines that this M is the correct M to bind and ignores the other two overloaded methods M. In response to calling this M method, a "1" is printed on the console.

The line:

C.M(d, d);

corresponds to fully dynamic binding. This call to M takes two dynamic arguments and thus will be completely dynamically bound based on the runtime type of the arguments d and d. Because both arguments have the static type "dynamic" which defers binding to runtime, and because both the arguments are strings, the arguments are examined at runtime, determined to be strings and therefore the overloaded method declared in the line:

static void M(string s1, string s2) {Console.WriteLine ("3");} that accepts two string type arguments, is selected and bound at runtime. Dynamic binding is used for both arguments d and d and binding is fully dynamic. In response to executing the line:

C.M(d, d);

a "3" is printed on the console.

The line:

C.M(o, d);

illustrates hybrid binding, using static binding for the first and dynamic binding for the second argument. When the overloaded method M in class C is called with a static type argument of type object (argument o) and a static type argument of type dynamic (argument d) in the constituent expression, the compiler will defer binding to runtime because there is an argument of type dynamic in the list of arguments that method M receives. The binding that occurs at runtime will ignore the runtime type of the first argument, argument o, using the type that was known at compile time for argument o (which was object) because the compile time type of argument o was not "dynamic". Hence binding will be based on the static type of the first argument and the runtime type of the second argument. The compile time type of the first argument is object. The runtime type of the second argument (argument d) is string. Hence the method bound at runtime is the second overloaded method M, as defined in the line:

static void M(object o1, string s2) {Console.WriteLine ("2");}

This overloaded method is selected for binding even though the first object was also a string at runtime. That is, although at runtime, the binding logic knows that the runtime type of o is a string, because the first argument was passed as type object, the binding logic chooses not to look at the most specific type information available, and instead uses the type information that was known at compile time for the o argument. In response to calling method M in class C with arguments o and d, "2" is printed on the console.

The third call:

C.M(d, d);

also illustrates another hybrid kind of binding, where the receiver (in this case the type C) is statically determined, and hence so is the set of possible "M" methods, but the selection of which of the three Ms is used is based on dynamic binding of the arguments. This kind of dynamic dispatch can be employed with instance member access as well as when doing static method calls on types, as illustrated by the following program:

```
class C {
    void M(string s) { Console.WriteLine("string"); }
    void M(int i) { Console.WriteLine("int"); }
}
C c = new C( );
dynamic d = "Hello";
c.M(d); // prints string
```

In accordance with aspects of the subject matter disclosed herein, the method M in class C is bound statically based on the type of the instance of the receiver and dynamically based on the type of the argument. In the program above, the receiver C does not have to be dynamic for the method M to be dynamically bound. That is, even though variable c of class C is static, the method call:

c.M(d);

is dynamically bound because the argument d is dynamic.

At compile time the compiler examines the type of variable c of class C and determines that there are 2 overloaded methods M in class C. Hence, there is a closed set of methods (exactly two) that can be bound when a call is made to class C. The compiler does not determine which of the two methods to bind to because the argument has the static type dynamic which signals to the compiler to defer binding to runtime. Because variable d actually contains a string at runtime, in response to calling method M with argument d, "string" is printed on the console because at runtime the variable d contains the string "Hello". Although the argument d contains the string "Hello", "string" is printed on the console because method M is defined as:

void M(string s) {Console.WriteLine("string");} which uses the fact that the argument is a string at runtime to determine to use the above overloaded method M which prints "string" on the console.

It will be appreciated that while the above example demonstrates that a method can be dynamically bound for a static receiver, analogous logic can be applied to dynamic binding with respect to other program elements. For example, constructors can be dynamically bound. The portion of the program reproduced below demonstrates use of dynamic binding for a newly created object that has a statically known set of overload candidates:

new C(d); //dynamic binding of constructor of known type

This line creates a new object of class C. The argument d is provided to the constructor(s) of class C. A class such as but not limited to class C can declare constructors which are program entities that are run when a new object is created. Which constructor is selected depends on the argument passed. Line:

new C(d);

passes the dynamic argument d to the constructor of class C. Because the argument d is dynamic, selection of the constructor to bind is deferred to runtime. Because only the constructors of class C are candidates, the set of candidates is closed Similarly, an indexer on a known type in a statically bound language can be dynamically bound, as demonstrated by the partial program:

c[d];

This line dynamically binds an indexer of a known type.

It will be appreciated that binding occurs at compile time if it is based exclusively on compile time types because runtime information is typically not yet available at compile time. This type of binding is called fully static binding. If binding is not to occur exclusively at compile time, the runtime types of computed values are examined to determine runtime type. Thus, whenever there is at least one dynamic argument, receiver, etc. binding is deferred to runtime. When binding is deferred to runtime, it would seem logical to expect that the result of binding (e.g., which overloaded method will be bound) is unknown at compile time and also what the result type of the operation is. For example, if the universe of available methods M includes 3 different overloaded methods that return three different types: int, string and object, it will be known at least that there are 3 different possible methods to choose from but it will not be known at compile time whether the result is int, string or object. Hence for many operations bound at runtime using dynamic binding or hybrid binding, the result type is taken to be dynamic. That is, if a method is selected at runtime, the compiler typically cannot know the return type of the method and therefore assigns the static type dynamic to the result.

For example, consider the following program code:

dynamic d= . . . ;
var result=d.M(1, "hello"); // result has type dynamic

In this piece of code, a dynamic variable d is created and is set to some value, signified by the ellipsis. The method M on d is then called. The method M called on d is dynamically bound so the compiler in unable to determine what the result type of calling M is. Thus a variable called result is declared and the type of the variable is inferred based on the assignment of d.M(1, "hello"). Because the assigned expression is dynamic, the result is inferred to have type dynamic as well.

There are, however, exceptions to this rule. If, for example, the set of candidate operations is known at compile time (e.g., because only arguments (not the receiver) are dynamic) and all the candidate operations had the same return type, that return type can be selected as the static type of the operation, as regardless of which candidate is chosen at runtime, the result is known to have that type. Hence in accordance with some aspects of the subject matter disclosed herein, the return type of the operation is inferred from the return type that is shared among the universe of candidate methods, however it will be appreciated that in the interest of simplifying usage this approach may not be implemented.

In accordance with some aspects of the subject matter disclosed herein, certain kinds of operations may always return results of the same type. In these cases, the compile time type of the result will be known at compile time even if the result is dynamic. For example, the syntax used for constructors in some languages may declare the type of the result. For example, consider the following program code:

dynamic d= . . . ;
C c=new C(d);

creates a variable d of static type "dynamic". The next line creates a dynamically bound constructor with static type C and assigns it to variable c of class C. Because it is known that class C is static regardless of the constructor called, even for constructor calls that are bound dynamically, the compiler knows the type of the result and can use that knowledge to select the appropriate type for the result of the constructor call.

Similarly, conversions typically convert to a particular known type. Hence, successful conversions result in the indicated result type so the compiler knows the type of the result even though the element converted is dynamic and the conversion itself is bound dynamically. Not until runtime is the actually meaning of the conversion determined. That is, at runtime the type of the object is determined. How the conversion is performed depends on the runtime type of the object but the result type, what the object is converted to, is known at compile time. A particular conversion can be implicit or explicit. For example, consider the following program code:

int i=d; // dynamically bound implicit conversion to static type int

This line is an example of a dynamically bound implicit conversion to the static type "int". The conversion is dynamically bound because d is dynamic and the conversion is implicit because d is assigned to a variable i that is declared to be of type int. In practice the implicit conversions in particular can be useful, because they provide a syntactically transparent avenue back from dynamically to statically bound code.

An example of an explicit conversion is the following sample program code:

string s=(string)d; // dynamically bound explicit conversion to static type string This is dynamically bound because d is dynamic and the conversion is explicit because the expression (string)d indicates that the variable d is passed as a string. Hence unless there is a runtime error, the result is a string.

Finally Boolean operations return Boolean (true or false) results. Hence whenever program code takes the form:

if (d)<sequence of statements> the value of d is always assumed to be Boolean. At runtime the actual value of d may either be converted to Boolean using an implicit conversion, as described above, or application of the operator true.

In practice the implicit conversions in particular are extremely useful, because they provide a syntactically transparent avenue back from dynamically to statically bound code.

Because dynamically bound operations are bound at runtime, errors occurring when the binding fails can not in general be reported at compile time, but instead are reported as runtime failures. Nevertheless, for some classes of dynamic binding, certain errors can be reported at compile time. For example, when the candidate set of operations is known at compile time (as described above) it is sometimes possible to deduce that a given set of arguments can never fit any of the candidates, regardless of their runtime types.

Partial compile time checking of dynamically bound methods can be performed under certain circumstances. When the set of candidates for binding is closed, which occurs when the receiver is static and hybrid binding occurs, an error can be deduced when none of the universe of possible candidates has the right number of parameters, when a non-dynamic argument does not have the right type for the corresponding parameter in the given candidate and when the candidate is generic, but a partial type inference shows that no type arguments can possibly be inferred. In these conditions, a compile time error can be provided by the compiler for dynamically bound methods.

Example of a Suitable Computing Environment

Figure 3:
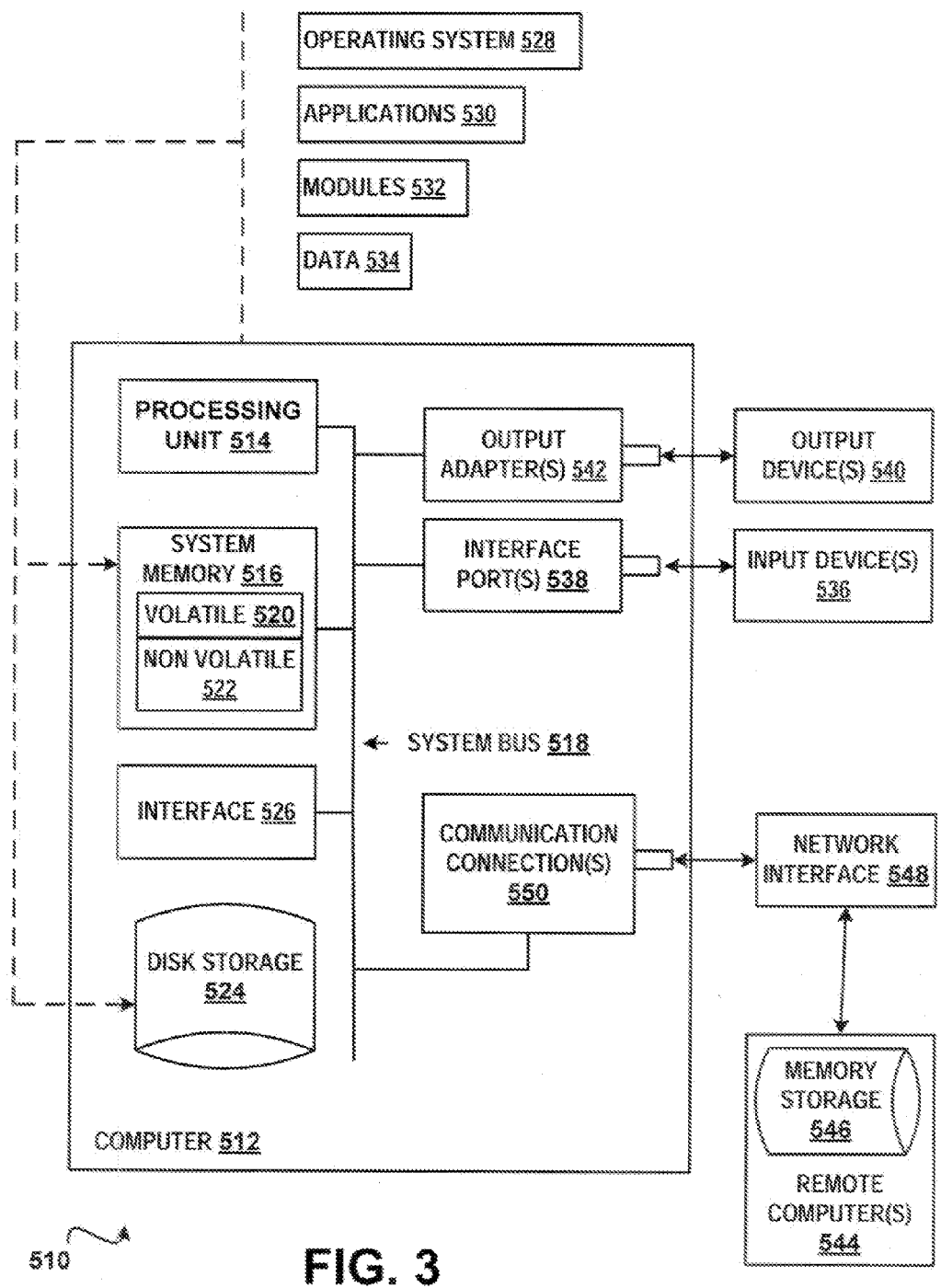
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
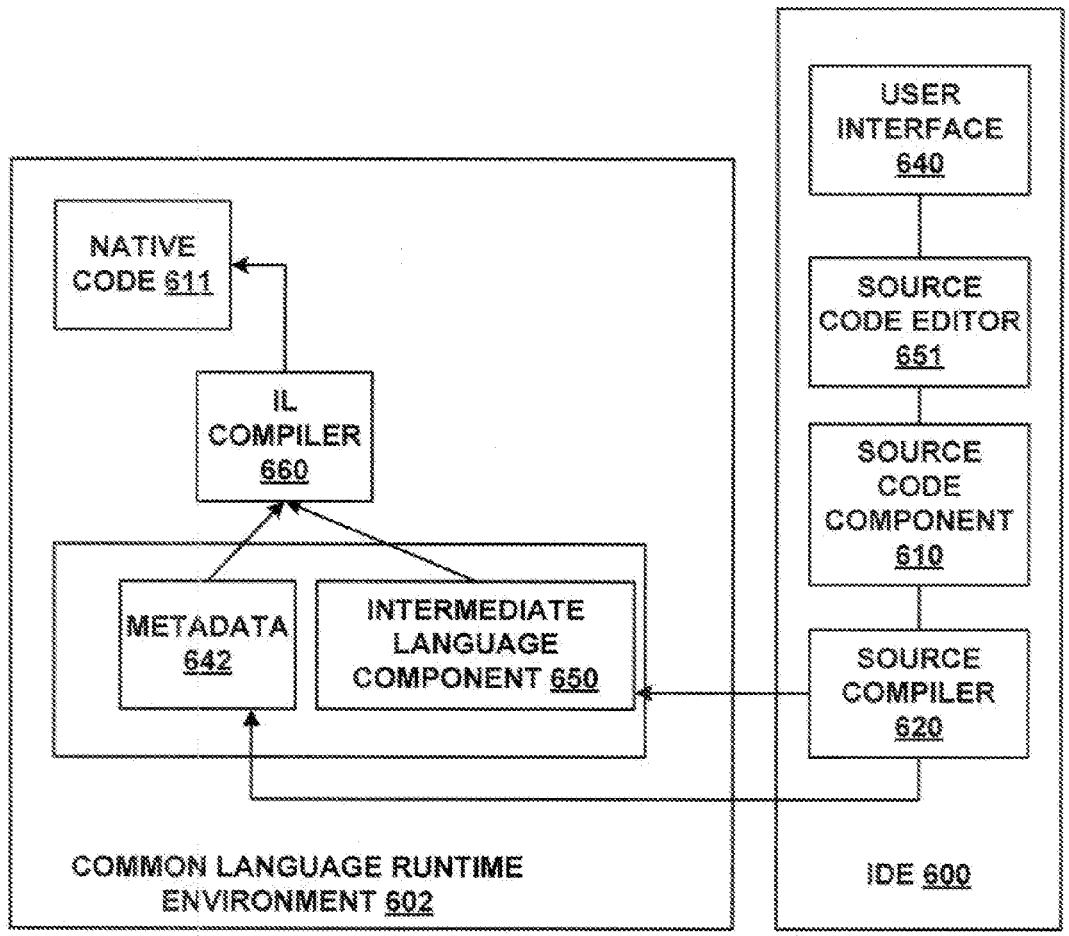
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory including a compiler configured to cause the processor to:
determine if a source code statement in a programming language using semantics for a statically bound language includes an expression or subexpression associated with an operation includes a second type indicating that binding occurs at runtime;
defer binding of the operation to runtime when the operation includes the second type indicating binding occurs at runtime, wherein binding of the operation is based on a compile time type of the expression associated with the operation, wherein the expression comprises a subexpression of a first type and wherein binding of the operation is based on a runtime type of a value of a subexpression of the second type;
examining a universe of binding candidates for the second type indicating that binding occurs at runtime;
determining if the universe of binding candidates is a closed set;
generating an error list of dynamic binding errors at compile time when the universe is a closed set; and
deferring generation of the error list of binding errors to runtime when the universe is not a closed set.

2. The system of claim 1, wherein an expression of the operation comprises a plurality of subexpressions, wherein a subexpression comprises an argument, a receiver, an index or an operand.

3. The system of claim 1, wherein the operation comprises a method call, an operator application, a field access, a member access, a property access, an implicit conversion, an explicit conversion, a constructor call or an indexer access.

4. The system of claim 1, wherein binding is deferred to runtime directed by a specified static type assigned to the value of the subexpression of the second type, wherein the specified static type signals to the compiler to defer binding the operation associated with the value of the subexpression of the second type until runtime.

5. The system of claim 1, wherein the operation comprises a static receiver and wherein the operation is bound at runtime.

6. The system of claim 1, wherein the compiler determines a closed set of candidate meanings for the operation at compile time.

7. The system of claim 1, wherein the compiler generates a report of runtime errors at compile time.

8. A method of hybrid binding comprising:
receiving a program statement of a computer program in a programming language having binding semantics designed for a statically bound language, wherein the program statement comprises an operation and is received by a compiler of a software development computer;
determining that an expression of the operation is associated with a static compile time type dynamic indicating binding occurs at runtime, the expression comprising at least two constituents,
determining if a set of candidate meanings for the operation is a closed set at compile time as at least one of the constituents of the expression is static and one of the constituents of the expression is dynamic;
when the set of candidate meanings for the operation is determined to be a closed set:
generating a list of binding errors at compile time for the expression of the operation that is associated with the static compile time type dynamic;
when the set of candidate meanings for the operation is determined not to be a closed set:
generating a list of binding errors at runtime for the expression associated with the static compile type dynamic; and
deferring binding of the operation until runtime when the operation includes the static compile type dynamic indicating binding occurs at runtime.

9. The method of claim 8, wherein the expression comprises an argument, a receiver, an index or an operand.

10. The method of claim 8, further comprising:
determining that each of the closed set of candidate meanings for the operation shares a return type;
inferring a static return type of the operation from the shared return type.

11. The method of claim 8, wherein the operation comprises a constructor call, an implicit conversion, an explicit conversion or a Boolean operation.

12. The method of claim 8, further comprising:
wherein one of the at least two constituents is static and wherein one of the at least two constituents is dynamic; and
reporting runtime errors at compile time in response to determining that no values for the at least two constituents fits a candidate meaning of the set of candidate meanings for the operation.

13. The method of claim 12,
wherein determining that no values for the at least two constituents will fit the candidate meaning of the set of candidate meanings for the operation comprises determining that no candidate meaning in the set of candidate meanings for the operation has a number of constituents that corresponds to a number of the at least two constituents of the expression.

14. The method of claim 12, wherein a type of a non-dynamic argument does not match a type for a corresponding parameter in each candidate meaning in the set of candidate meanings for the operation.

15. A hardware computer-readable storage device comprising computer-executable instructions which when executed cause at least one processor to:
receive a program statement of a computer program in a programming language having binding semantics designed for a statically bound language, wherein the program statement is received by a compiler of a software development computer;
determine that a constituent of an expression in the program statement in the semantics for a statically bound language is dynamic, determine that the expression comprises an operation;
determine at compile time a set of candidate operations for binding to the operation;
determine if the set of candidate operations for binding is a closed set; and
when the set of candidate operations for binding is a closed set:
generate a list of binding errors for the dynamic constituent of the expression in the program statement at compile time;
when the set of candidate operations for binding is not a closed set:
generate a list of binding errors for the dynamic constituent of the expression in the program statement at runtime; and
defer binding of the operation until runtime when the constituent of the expression in the program statement is dynamic.

16. The computer-readable storage device of claim 15, comprising further computer-executable instructions, which when executed cause the at least one processor to:
determine that the expression comprises at least two constituents comprising a first constituent and a second constituent, wherein the first constituent is static and wherein the second constituent is dynamic; and
report runtime errors at compile time in response to determining that no values for the first constituent and the second constituent will fit a candidate operation of the set of candidate operations.

17. The computer-readable storage device of claim 16, comprising further computer-executable instructions, which when executed cause the at least one processor to:
determine that no values for the first constituent and the second constituent will fit the candidate operation of the set of candidate operations by determining that no candidate operations in the set of candidate operations has a number of arguments that corresponds to a number of constituents of the expression.

18. The computer-readable storage device of claim 16, comprising further computer-executable instructions, which when executed cause the at least one processor to:
determine that no values for the first constituent and second constituent will fit the candidate operation of the set of candidate operations by determining that a type of a non-dynamic argument of the operation does not match a type for a corresponding parameter in each candidate of the set of candidate operations.

19. The computer-readable storage device of claim 16, comprising further computer-executable instructions, which when executed cause the at least one processor to:
determine that no values for the first constituent and second constituent will fit the candidate operation of the set of candidate operations by determining that no type arguments can be inferred.

20. The computer-readable storage device of claim 15, comprising further computer-executable instructions, which when executed cause the at least one processor to:
defer binding until runtime in response to determining that a return type of dynamic is assigned to an operation result.

* * * * *